US011315163B1

(12) United States Patent
Raak et al.

(10) Patent No.: US 11,315,163 B1
(45) Date of Patent: Apr. 26, 2022

(54) FOOD ITEM SELECTION SYSTEM BASED ON RIPENESS AND RELATED METHODS

(71) Applicant: Inmar Clearing, Inc., Winston-Salem, NC (US)

(72) Inventors: Alise Raak, Winston-Salem, NC (US); Andreas M. Benamou, Spicewood, TX (US); Sean A. Briscoe, Greensboro, NC (US); Diana Medina, Winston-Salem, NC (US); Jess D. Walker, Georgetown, TX (US)

(73) Assignee: INMAR CLEARING, INC., Winston-Salem, NC (US)

( * ) Notice: Subject to any disclaimer, the term of this patent is extended or adjusted under 35 U.S.C. 154(b) by 317 days.

(21) Appl. No.: 16/539,588

(22) Filed: Aug. 13, 2019

(51) Int. Cl.
G06Q 30/00 (2012.01)
G06Q 30/06 (2012.01)
G06Q 30/02 (2012.01)

(52) U.S. Cl.
CPC ..... *G06Q 30/0629* (2013.01); *G06Q 30/0239* (2013.01)

(58) Field of Classification Search
CPC .............. G06Q 30/0629; G06Q 30/0239
USPC ............................................ 705/26, 27
See application file for complete search history.

(56) References Cited

U.S. PATENT DOCUMENTS

| | | | |
|---|---|---|---|
| 6,363,366 B1 | 3/2002 | Henty | |
| 9,593,982 B2 | 3/2017 | Rhoads et al. | |
| 9,824,298 B1 | 11/2017 | Gorumkonda | |
| 11,138,554 B2* | 10/2021 | Johnsen | H04W 4/35 |
| 2011/0054992 A1* | 3/2011 | Liberty | G06Q 30/0223 705/14.24 |
| 2014/0278906 A1* | 9/2014 | Sullivan | G06Q 30/0238 705/14.38 |
| 2014/0304105 A1* | 10/2014 | Zamer | G06Q 30/0631 705/26.7 |
| 2016/0267567 A1* | 9/2016 | Shinkle, II | G06Q 30/0269 |
| 2017/0300856 A1* | 10/2017 | Wilkinson | G06K 19/0717 |
| 2019/0102788 A1* | 4/2019 | Lewis | G06Q 30/0206 |
| 2019/0164187 A1* | 5/2019 | Costello | G06Q 30/0238 |
| 2019/0276176 A1* | 9/2019 | Almogy | B65G 65/365 |
| 2019/0340749 A1* | 11/2019 | Schwartzer | G01N 21/31 |

OTHER PUBLICATIONS

Ohali, Yousef Al, "Computer Vision Based Date Fruit Grading System: Design and Implementation," Journal of King Saud University—Computer and Information Sciences, vol. 23 (2011), pp. 29-36.*

(Continued)

*Primary Examiner* — Robert M Pond
(74) *Attorney, Agent, or Firm* — Allen, Dyer, Doppelt + Gilchrist, P.A.

(57) ABSTRACT

A food item selection system may include a remote device configured to obtain an image of a food item having an associated ripeness and a selection server configured to store respective ripeness preferences for users. The selection server may also be configured to obtain the image of the food item from the remote device, determine a ripeness of the food item based upon the image, and associate the image with a given user from among the users. The selection server may also be configured to compare the determined ripeness with the respective ripeness preference for the given user and send a selection notification to the remote device based on the comparing.

23 Claims, 4 Drawing Sheets

(56) References Cited

OTHER PUBLICATIONS

Balogun et al., "Mini Review: Artificial Neural Network Application on Fruit and Vegetables Quality Assessment," International Journal of Scientific & Engineering Research, vol. 5, Issue 6 (Jun. 2014), pp. 702-708.*

Wasiu et al.: "Mini Review: Artificial Neural Network Application on Fruit and Vegetables Quality Assessment," International Journal of Scientific & Engineering Research, vol. 5, Issue 6, Jun. 2014; Google 7pgs. (Year: 2014).*

\* cited by examiner

FOOD ITEM SELECTION SYSTEM BASED ON RIPENESS AND RELATED METHODS

TECHNICAL FIELD

The present invention relates to the field of food item selection, and more particularly, to ripeness based food item selection and related methods.

BACKGROUND

Many food items have an associated ripeness. For example, many food items sold in a store have a ripeness that changes over time. For example, food items on a display may initially be under-ripe, but as time passes, those same food items become more ripe and eventually may become over-ripe.

A shopper may have a particular preference for a certain ripeness of a given food item. The desired ripeness varies from shopper to shopper. While it may be relatively easy for a shopper to pick her own food item at the desired ripeness, selecting a food item with the desired ripeness may be more difficult when the food item is being selected by someone else, for example, as is the case when food items are purchased electronically or online.

U.S. Pat. No. 9,824,298 to Gorumkonda is directed to prediction and detection of product quality. More particularly, Gorumkonda discloses visual or infrared characteristics of a produce item (e.g., skin, shape, wrinkles, and other characteristics of an apple, pepper, etc.) being compared with ripeness characteristics of the type of produce item (e.g., other apples or peppers). The ripeness characteristics may correspond with the type of produce item at different stages of ripeness along a ripeness regression (e.g., a timeline of the produce item from raw to rotten). One or more ripeness scores of the produce item may be determined along a timeline (e.g., raw at day 1, rotten at day 10, etc.), so that when a user requests a produce item corresponding with a particular ripeness score, the produce item can be provided to the user based in part on the visual or infrared characteristics of the produce item and ripeness regression.

U.S. Pat. No. 6,363,366 to Henty is directed to a system for identification, pricing, and inventory monitoring of produce at supermarket checkouts which automates the checkout process to a degree comparable to the handling of bar coded products. A produce identification and pricing system includes an imager which provides image data from produce being passed through the checkout system. A signal processor provides a real-time identification of the produce employing at least a spectral matching operation between a spectral signature vector derived from the image data from the produce and stored spectral signature vectors. An imager which is enhanced for detecting spectral information in the near infrared region may be employed. If a suitable match is not found using the spectral image data, the identification operation proceeds using more complicated signatures derived from two dimensional image data. The more complex signatures may be compared to a truncated target set which is dramatically reduced from the initial target set based on the use of the spectral image data. If a unique best match is not found within a predetermined time window the best candidate matches are displayed and the checkout operator selects the correct match through a touch screen, push button, or voice input.

U.S. Pat. No. 9,593,982 to Rhoads et al. discloses a smartphone adapted for use as an imaging spectrometer.

SUMMARY

A food item selection system may include a remote device configured to obtain an image of at least one food item having an associated ripeness and a selection server. The selection server may be configured to store respective ripeness preferences for a plurality of users, and obtain the image of the at least one food item from the remote device. The selection server may also be configured to determine a ripeness of the at least one food item based upon the image, and associate the image with a given user from among the plurality thereof. The selection server may also be configured to compare the determined ripeness with the respective ripeness preference for the given user and send a selection notification to the remote device based on the comparing.

The selection server may be configured to generate a digital promotion for the at least one food item based upon the comparing, for example. The at least one food item may include a plurality of food items each having a different associated ripeness, and the selection server may be configured to compare a respective determined ripeness of each food item with the respective ripeness preference for the given user and send the selection notification indicating a ripeness match.

The selection server may be configured to use machine learning to build the respective ripeness preferences for the plurality of users. The selection notification may include a reject purchase selection notification, for example. The selection notification may include an accept purchase selection notification.

The remote device may include a point-of-sale (POS) terminal, for example. The remote device may include a mobile wireless communications device.

The mobile wireless communications device may include a mobile device processor and a display coupled thereto, and the mobile device processor may be configured to display the selection notification on the display with the image of the at least one food item.

The ripeness preference may be based upon a color of the at least one food item, for example. The remote device may be configured to be carried by a store order picker, for example.

A method aspect is directed to a method of selecting a food item. The method may include using a selection server to store respective ripeness preferences for a plurality of users. The method may also include using the selection server to obtain an image of at least one food item having an associated ripeness from a remote device, determine a ripeness of the at least one food item based upon the image, and associate the image with a given user from among the plurality thereof. The method may also include using the selection server to compare the determined ripeness with the respective ripeness preference for the given user and send a selection notification to the remote device based on the comparing.

A computer readable medium aspect is directed to a non-transitory computer readable medium for selecting a food item. The non-transitory computer readable medium includes computer executable instructions that when executed by a processor cause the processor to perform operations. The operations may include storing respective ripeness preferences for a plurality of users, obtaining an image of at least one food item having an associated ripeness from a remote device, determining a ripeness of the at least one food item based upon the image, and associating the image with a given user from among the plurality thereof. The operations may also include comparing the determined ripeness with the respective ripeness preference for the given user and sending a selection notification to the remote device based on the comparing.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
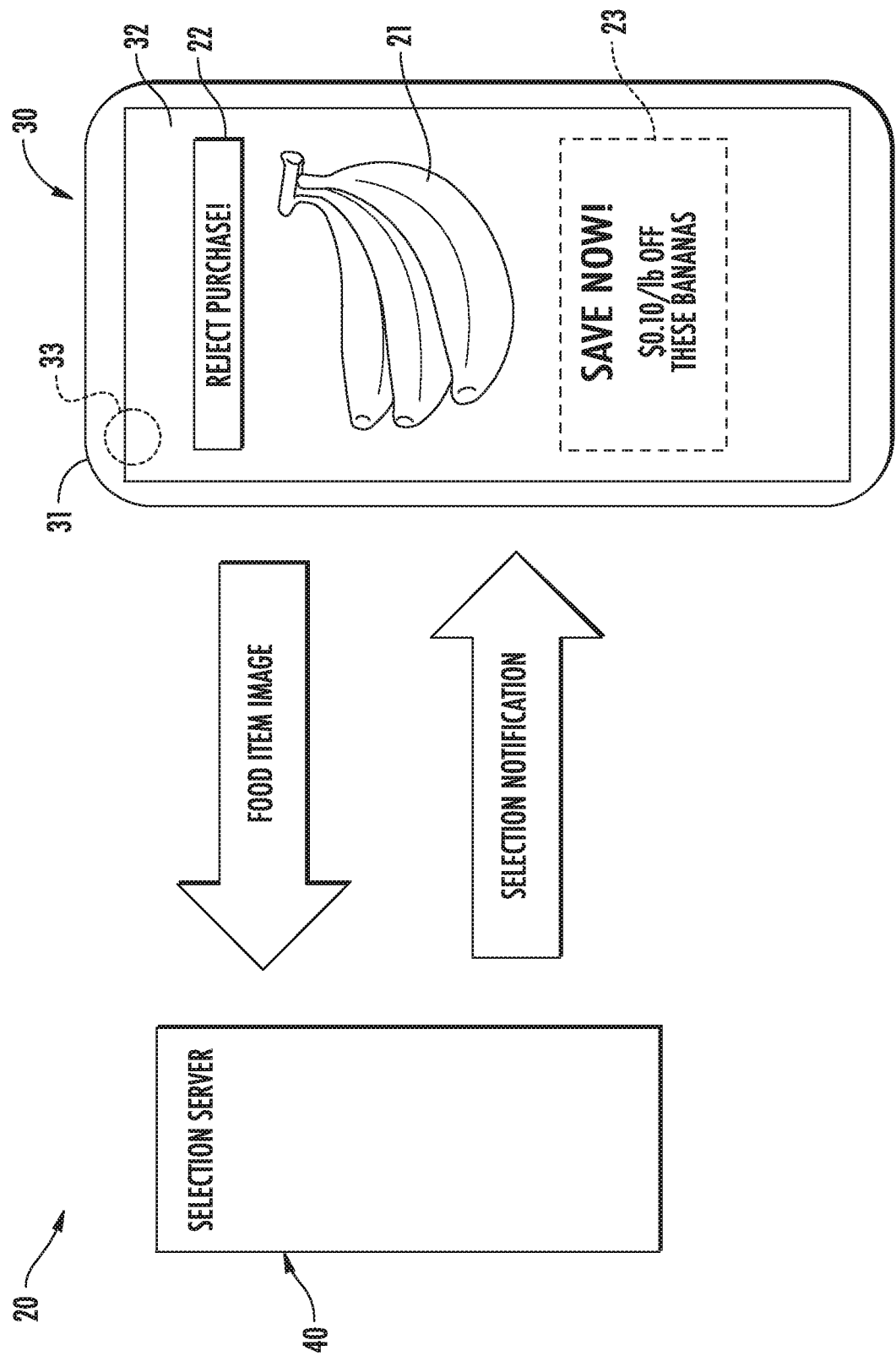
FIG. 1 is a schematic diagram of a food item selection system in accordance with an embodiment.
Figure 2:
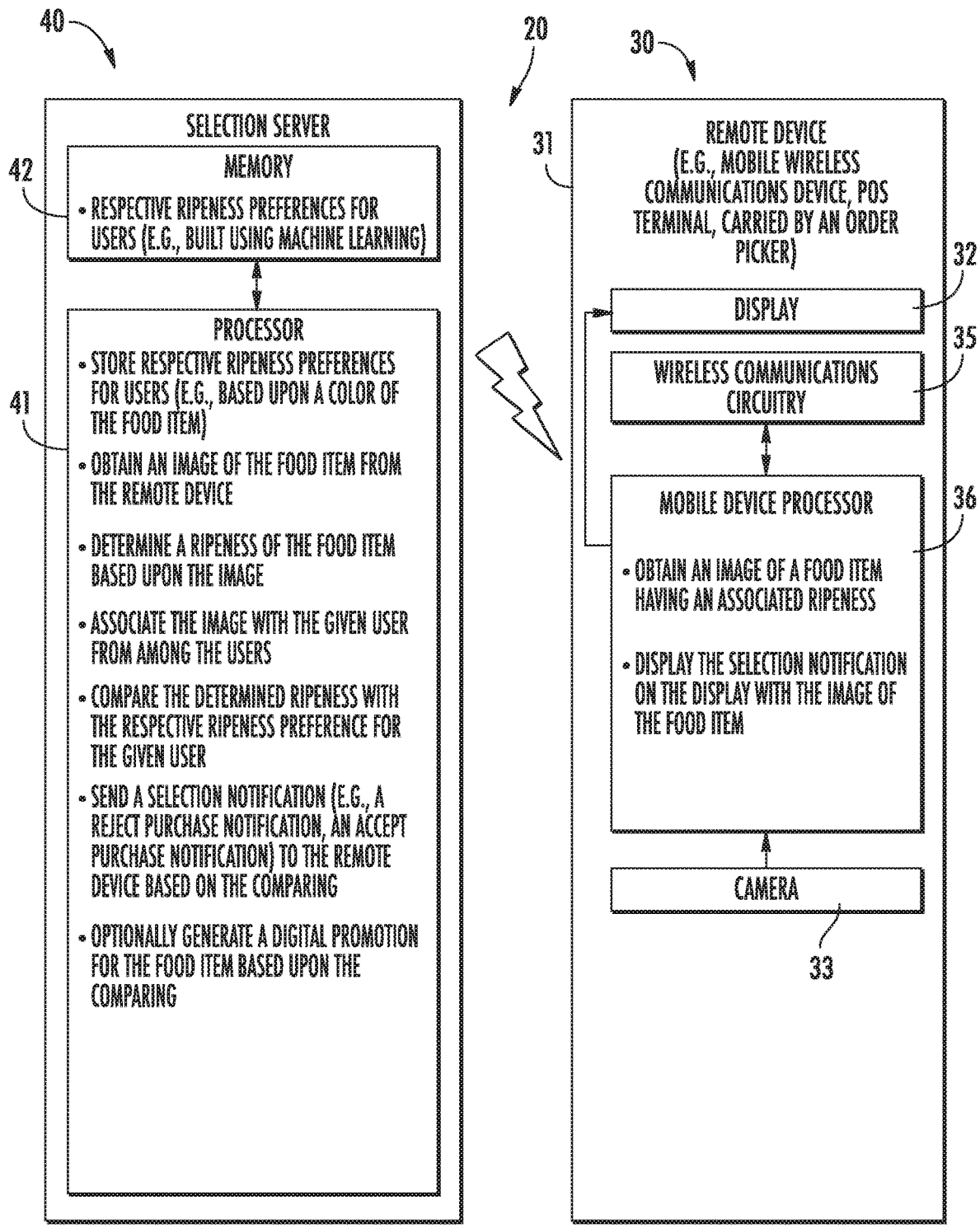
FIG. 2 is a schematic block diagram of the food item selection system of FIG. 1.

Referring initially to FIGS. 1-2, a food item selection system 20 for determining ripeness of a food item 21 includes a remote device 30. The remote device 30 is illustratively in the form of a mobile wireless communications device, and more particularly, a mobile or smart phone that includes a display 32 and wireless communications circuitry 35 carried by a portable housing 31 and coupled to a mobile device processor 36. A camera 33 is also carried by the portable housing 31 and coupled to the mobile device processor 36.

The remote device 30 may be a tablet computer, and/or wearable device, for example. The remote device 30 is illustratively carried by a store order picker. The remote device 30 may be carried by another person, for example, the purchaser or user for whom the order is being picked. The remote device 30 may be carried by a machine or non-human, such as, for example, a robot. The remote device 30 may be carried adjacent or by a food item display. In some embodiments, the remote device 30 may be in the form of a point-of-sale (POS) terminal. The remote device 30 obtains an image of the food item 21. The food item 21 has an associated ripeness. For example, the food item 21 may be a bunch of bananas, and the ripeness may be determined based upon a color of the skin of the banana (e.g., green, yellow, brown). Of course, the food item 21 may include another type of food that becomes ripe.

The remote device 30 obtains an image of the food item 21, for example, by way of cooperation between the camera 33 and mobile device processor 36. The image of the food item 21 obtained may be a full image or partial image of the food item and/or may include image data associated with the food item. The remote device 30 may obtain the image of the food item 21 as a standalone image or as a series of images, which may be displayed on the display 32. For example, live images obtained by the camera 33 may be displayed on the display 32.

The food item selection system 20 also includes a selection server 40 that includes a processor 41 and an associated memory 42. While operations of the selection server 40 are described herein, it should be understood that the operations of the selection server occur through cooperation between the processor 41 and the memory 42.

Figure 3:
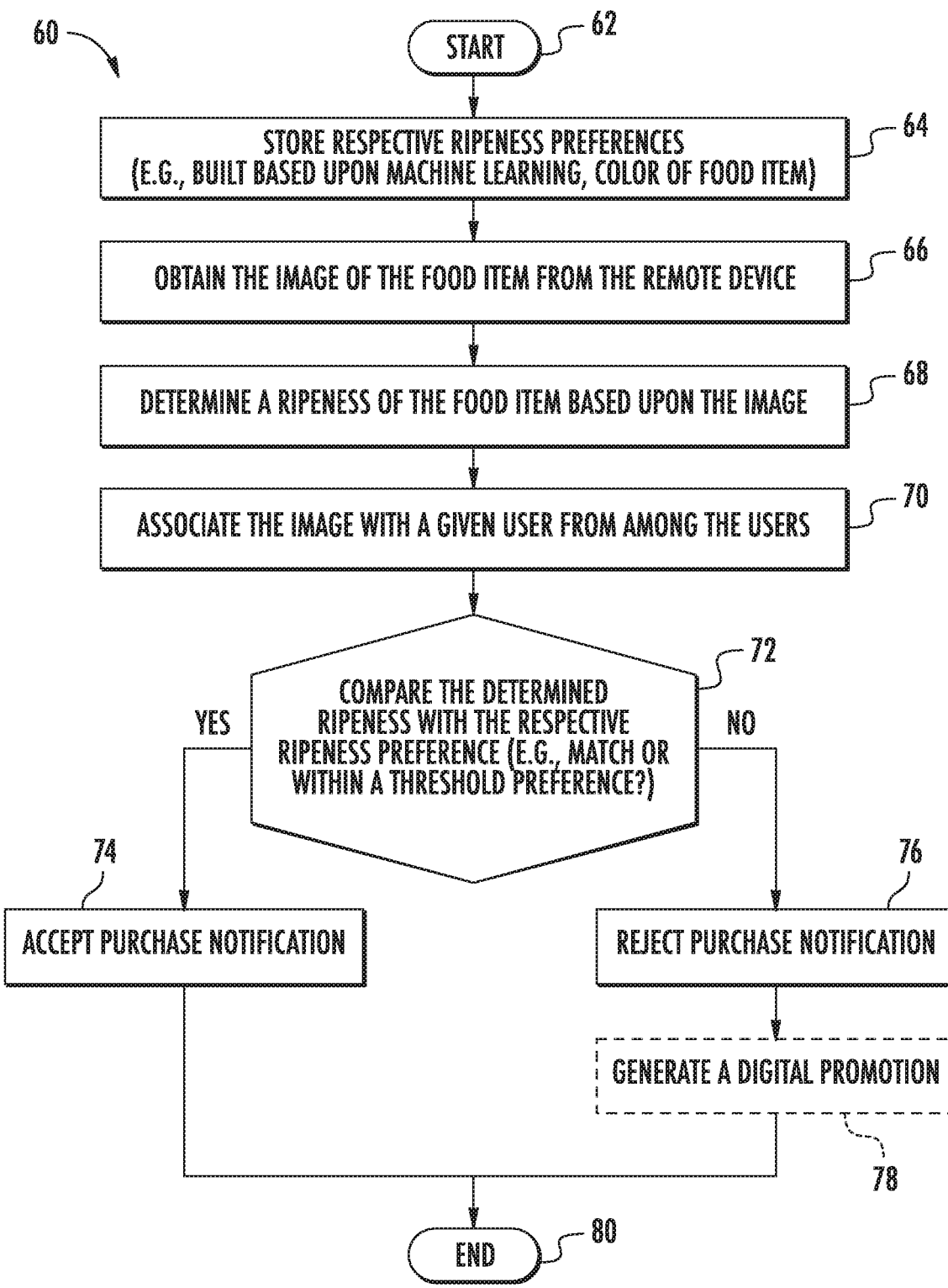
FIG. 3 is a flow diagram illustrating operation of the selection server of the food item selection system of FIG. 2.

Referring now to the flowchart 60 in FIG. 3, operations of the selection server 40 with respect to determining ripeness will now be described. Beginning at Block 62, the selection server stores respective ripeness preferences for users (Block 64). For example, the ripeness preferences may include the desired ripeness of food items 21 for a given user (e.g., with respect to bananas, whether the user prefers greener or more yellow bananas). Initial ripeness preference may have been selected and stored based upon user selection of images corresponding to desired ripeness, by providing feedback on food items that have been purchased by store order picker, and/or based upon purchased made by the given user. The selection server 40 may use machine learning based upon an initial set of ripeness preference learning data to learn the ripeness preferences, as will be appreciated by those skilled in the art.

The selection server 40 obtains the image of the food item 21 from the remote device 30 (Block 66). At Block 68, the selection server 40 determines a ripeness of the food item 21 based upon the image. More particularly, the selection server 40 performs an image analysis to determine features of the food item 21 indicative of ripeness, such as, for example, color, texture, size, and/or shape. Of course, other features of the food item 21 may be used by the selection server 40 to determine ripeness.

The selection server 40, at Block 70, associates the image of the food item 21 with a given user from among the users. More particularly, a user identifier, such as, for example, a loyalty account identifier, username, phone number, or other identifier may be used to associate the image of the food item 21 with a particular user and thus access that user's ripeness preference.

The selection server 40 compares the determined ripeness with the respective ripeness preference for the given user (Block 72). More particularly, the selection server 40 may determine whether the determined ripeness of the food item 21 from the image matches the ripeness preference or is within a threshold ripeness of the ripeness preference. The selection server 40 compares the image of the food item 21 and any stored images, for example, to determine any differences, for example, in color. In some embodiments, image data may be used as a basis for the comparison.

The selection server 40 sends a selection notification 22 to the remote device 30 based on the comparing (Blocks 74, 76). More particularly, if the food item 21 matches or is within a threshold of the corresponding ripeness preference, the selection notification 22 may indicate such and be in the form of an accept purchase notification (Block 74). Such an accept purchase notification 22 may be in the form of a text notification on the display 32 of the mobile wireless communications device 30 or a colored indicator (e.g., green) indicative of purchase acceptance. In contrast, if the food item 21 does not match or is outside a threshold of the ripeness preference, the selection notification 22 may indicate such and be in the form of a reject purchase notification (Block 76). Such a reject purchase notification 22 may be in the form of a text notification on the display 32 of the mobile wireless communications device 30 or a colored indicator (e.g., red) indicative of purchase rejection. The selection notification 22 may alternatively or additionally include an audible notification and/or a haptic notification. Where the remote device 30 is associated with or carried by a store order picker, for example, the selection notification 22 may be particularly helpful in that it may let the store order picker know that he or she is picking the appropriately ripened food item.

At Block 78, the selection server 40 optionally generates a digital promotion 23 for the food item 21. More particularly, the selection server 40 may generate the digital promotion 23 for the food item 21 when the food item does not match the ripeness preference of the given user. For example, in the case of bananas, the user may prefer less ripe bananas, but the ripeness of the bananas in the image are riper than the ripeness preference. Accordingly, the bananas in the image may be less desirable to purchase. To entice the user to purchase the bananas that are not within the user's ripeness preference for bananas, the selection server 40 may generate the digital promotion 23 for those specific bananas. The digital promotion 23 may be for, for example, for $0.10 OFF per pound and may be applied at checkout at a POS terminal. A digital promotion 23 may be generated by the selection server 40 for any food item 21 and according to the user's respective ripeness preferences.

In some embodiments, the selection server 40 may communicate with the user to prompt or ask the user to accept the food item 21 outside of the ripeness preference and, when a digital promotion 23 is available, communicate the digital promotion with the prompt. Whether or not the user accepts the food item 21 that is outside of the ripeness preference (and with the digital promotion 23), the selection server 40 may update the user's respective ripeness preferences. More particularly, the selection server 40 may build the ripeness preferences for the given user based upon the use of machine learning. That is, as the user purchases the food items 21 (e.g., at a POS terminal, self-checkout, etc.), accepts food items outside of the respective ripeness preferences, and rejects food items outside the respective ripeness preferences, the selection server 40 may more accurately learn the ripeness preferences of the user. Operations end at Block 80.

Figure 4:
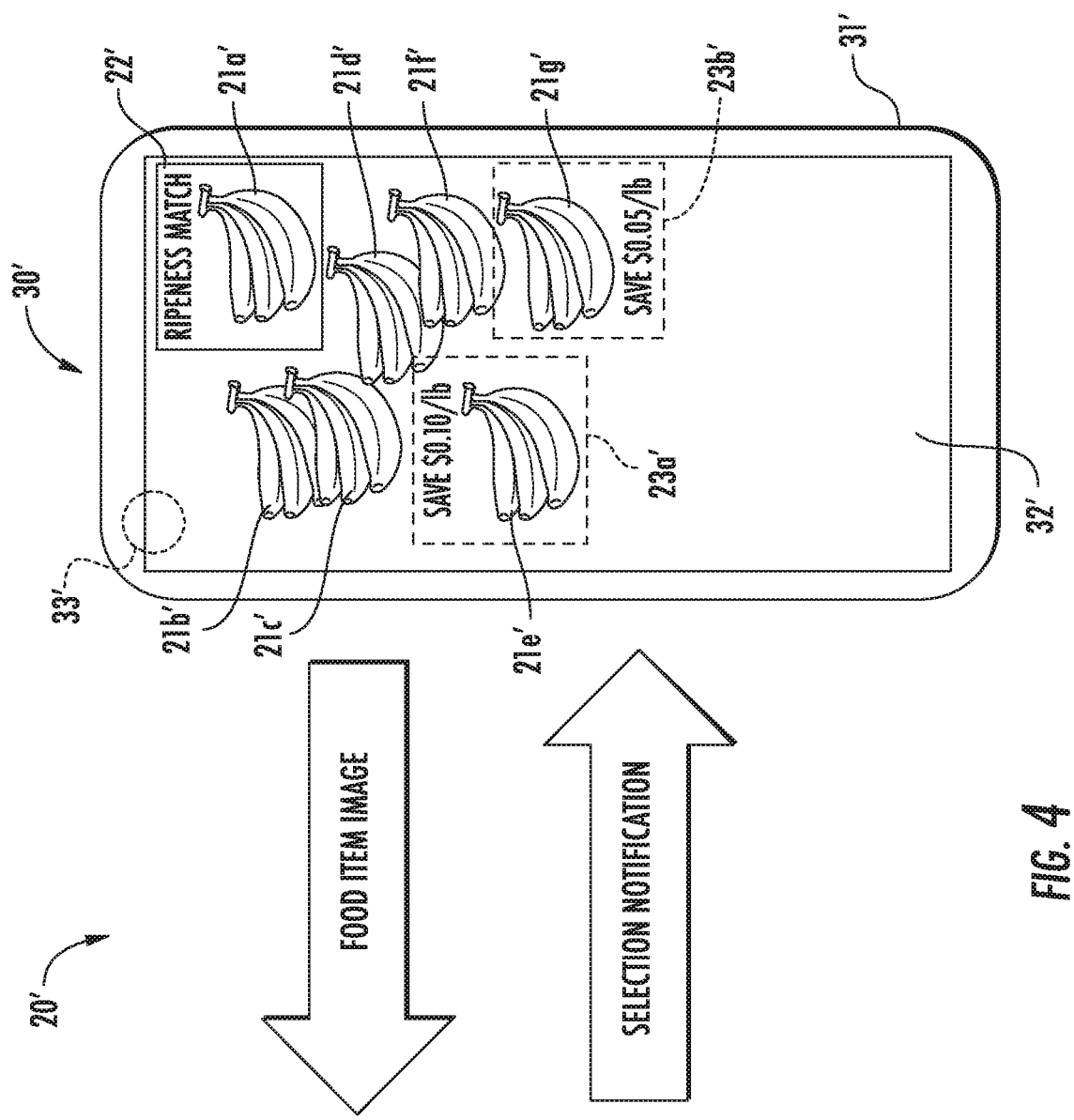
FIG. 4 is a schematic diagram of a food item selection system in accordance with another embodiment.
Figure 4:
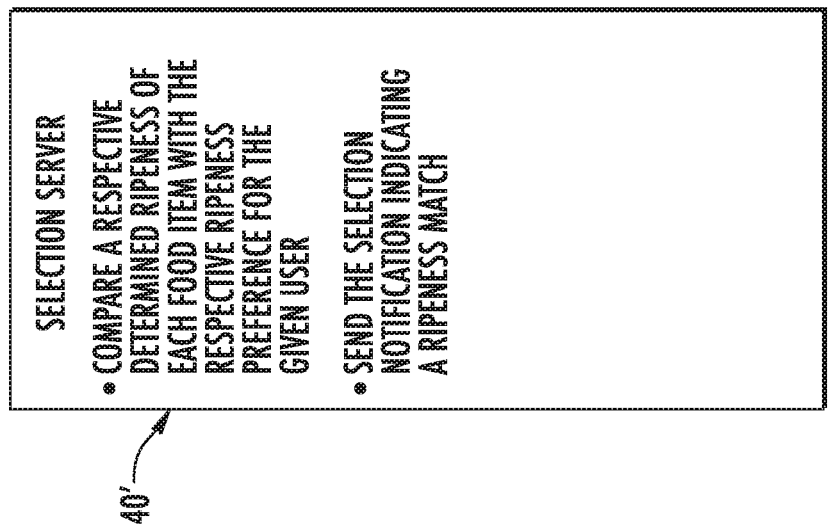

Referring now to FIG. 4, in another embodiment, the selection server 40' may compare a respective determined ripeness of each of several food items 21e-21g'. More particularly, for example, the remote device 30' may be held so that its camera 33' captures in an image several food items 21a'-21g' within its field of view. The selection server 40' determines a ripeness of each of the food items 21a'-21g' based upon the image. The selection server 40' compares the respective determined ripeness of each food item 21a'-21g' with the respective ripeness preference for the given user. The selection server 40' sends the selection notification 22' indicating a ripeness match. In other words, the selection notification 22' may identify which food item 21a'-21g' matches or most closely matches the ripeness preference for the given user for the food items. The selection notification 22' may be in the form of a visual indicator, e.g., a bounding box around the food item 21a' corresponding to the ripeness match (FIG. 4).

In some embodiments, the selection notification 22' may identify one or more than one as "accept purchase." The selection notification 22' may identify only those food items that correspond to "reject purchase." Of course, the selection notification 22' may only identify the best matched food item. In some embodiments, the selection server 40' may cooperate with an interactive display of food items 21a'-21g' to operate motorized lighting to focus on the food item corresponding to the ripeness match.

The selection server 40' may generate a digital promotion for one or more of the food items 21a'-21g'. More particularly, the selection server 40' may generate one or more a digital promotions 23a', 23b' for corresponding ones of the food items 21e', 21g' that are not within the ripeness preference. The digital promotions 23a', 23b' may have a promotional value that is set or determined by the selection server 40' and based upon how close or removed the corresponding ripeness is from the ripeness preference. The value of each digital promotion 23a', 23b' may be determined by other and/or additional techniques, as will be appreciated by those skilled in the art. In some embodiments, the selection server 40' may generate only one or even no digital promotions.

A method aspect is directed to a method of selecting a food item 21. The method includes using a selection server 40 to store respective ripeness preferences for a plurality of users. The method may also include using the selection server 40 to obtain an image of at least one food item 21 having an associated ripeness from a remote device 30, determine a ripeness of the at least one food item based upon the image, and associate the image with a given user from among the plurality thereof. The method also includes using the selection server 40 to compare the determined ripeness with the respective ripeness preference for the given user and send a selection notification 22 to the remote device 30 based on the comparing.

A computer readable medium aspect is directed to a non-transitory computer readable medium for selecting a food item 21. The non-transitory computer readable medium includes computer executable instructions that when executed by a processor 41 cause the processor to perform operations. The operations include storing respective ripeness preferences for a plurality of users, obtaining an image of at least one food item 21 having an associated ripeness from a remote device 30, determining a ripeness of the at least one food item based upon the image, and associating the image with a given user from among the plurality thereof. The operations also include comparing the determined ripeness with the respective ripeness preference for the given user and sending a selection notification 22 to the remote device 30 based on the comparing.

While several embodiments have been described herein, it should be appreciated by those skilled in the art that any element or elements from any one or more embodiments may be used with any other elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:
1. A food item selection system comprising:
a remote device configured to obtain an image of at least one food item having an associated ripeness; and
a selection server configured to
store respective ripeness preferences for a plurality of users,
obtain the image of the at least one food item from said remote device, determine a ripeness of the at least one food item based upon the image, and associate the image with a given user from among the plurality thereof, compare the determined ripeness with the respective ripeness preference for the given user and send a selection notification to said remote device based upon the at least one food item being outside the respective ripeness preference, the selection notification prompting the given user for one of acceptance and rejection of the at least one food item, update the ripeness preference of the given user based upon the acceptance or rejection from the given user to build the ripeness preference of the given user, generate a digital promotion for the at least one food item based upon the at least one food item being outside the respective ripeness preference, the digital promotion having a promotional value associated therewith, and set the promotional value of the digital promotion based upon a relative closeness of the determined ripeness to the updated respective ripeness preference.

2. The food item selection system of claim 1 wherein the at least one food item comprises a plurality of food items each having a different associated ripeness; and wherein said selection server is configured to compare a respective determined ripeness of each food item with the respective ripeness preference for the given user and send the selection notification indicating a ripeness match.

3. The food item selection system of claim 1 wherein said remote device comprises a point-of-sale (POS) terminal.

4. The food item selection system of claim 1 wherein said remote device comprises a mobile wireless communications device.

5. The food item selection system of claim 4 wherein said mobile wireless communications device comprises a mobile device processor and a display coupled thereto; and wherein said mobile device processor is configured to display the selection notification on said display with the image of the at least one food item.

6. The food item selection system of claim 1 wherein the ripeness preference is based upon a color of the at least one food item.

7. The food item selection system of claim 1 wherein said remote device is configured to be carried by a store order picker.

8. The food item selection system of claim 1 wherein the at least one food item comprises a plurality of food items; and wherein the selection server is configured to display the image of the plurality of food items, compare the determined ripeness of each food item with the respective ripeness preference for the given user, and for each food item being outside the respective ripeness preference, generate a respective digital promotion.

9. The food item selection system of claim 8 wherein the selection server is configured to set the promotional value of each digital promotion based upon a relative closeness of the determined ripeness of each food item to the updated respective ripeness preference, and display the promotional value of the digital promotion adjacent the corresponding food item.

10. The food item selection system of claim 8 wherein the selection server is configured to cooperate with said remote device to display the image of the plurality of food items thereon.

11. The food item selection system of claim 8 wherein the selection server is configured to cooperate with a further remote device associated with the given user to display the image of the plurality of food items thereon.

12. A selection server comprising:
a processor and an associated memory configured to
store respective ripeness preferences for a plurality of users,
obtain an image of at least one food item having an associated ripeness from a remote device, determine a ripeness of the at least one food item based upon the image, and associate the image with a given user from among the plurality thereof,
compare the determined ripeness with the respective ripeness preference for the given user and send a selection notification to the remote device based upon the at least one food item being outside the respective ripeness preference, the selection notification prompting the given user for one of acceptance and rejection of the at least one food item,
update the ripeness preference of the given user based upon the acceptance or rejection from the given user to build the ripeness preference of the given user,
generate a digital promotion for the at least one food item based upon the at least one food item being outside the respective ripeness preference, the digital promotion having a promotional value associated therewith, and
set the promotional value of the digital promotion based upon a relative closeness of the determined ripeness to the updated respective ripeness preference.

13. The selection server of claim 12 wherein the at least one food item comprises a plurality of food items each having a different associated ripeness; and wherein said processor is configured to compare a respective determined ripeness of each food item with the respective ripeness preference for the given user and send the selection notification indicating a ripeness match.

14. The selection server of claim 12 wherein the at least one food item comprises a plurality of food items; and wherein the processor is configured to display the image of the plurality of food items, compare the determined ripeness of each food item with the respective ripeness preference for the given user, and for each food item being outside the respective ripeness preference, generate a respective digital promotion.

15. The selection server of claim 14 wherein the processor is configured to set the promotional value of each digital promotion based upon a relative closeness of the determined ripeness of each food item to the updated respective ripeness preference, and display the promotional value of the digital promotion adjacent the corresponding food item.

16. A method for selecting a food item comprising:
storing, using a selection server, respective ripeness preferences for a plurality of users,
obtaining, using the selection server, an image of at least one food item having an associated ripeness from a remote device, determine a ripeness of the at least one food item based upon the image, and associate the image with a given user from among the plurality thereof,
comparing, using the selection server, the determined ripeness with the respective ripeness preference for the given user and send a selection notification to the remote device based upon the at least one food item being outside the respective ripeness preference, the selection notification prompting the given user for one of acceptance and rejection of the at least one food item, updating, using the selection server, the ripeness preference of the given user based upon the acceptance or rejection from the given user to build the ripeness preference of the given user, generating, using the selection server, a digital promotion for the at least one food item based upon the at least one food item being outside the respective ripeness preference, the digital promotion having a promotional value associated therewith, and setting, using the selection server, the promotional value of the digital promotion based upon a relative closeness of the determined ripeness to the updated respective ripeness preference.

17. The method of claim 16 wherein the at least one food item comprises a plurality of food items each having a different associated ripeness; and wherein using the selection server comprises using the selection server to compare a respective determined ripeness of each food item with the respective ripeness preference for the given user and send the selection notification indicating a ripeness match.

18. The method of claim 16 wherein the at least one food item comprises a plurality of food items; and further comprising, displaying, using the selection server, the image of the plurality of food items, comparing, using the selection server, the determined ripeness of each food item with the respective ripeness preference for the given user, and for each food item being outside the respective ripeness preference, generating, using the selection server, a respective digital promotion.

19. The method of claim 18 wherein the selection server sets the promotional value of each digital promotion based upon a relative closeness of the determined ripeness of each food item to the updated respective ripeness preference, and displays the promotional value of the digital promotion adjacent the corresponding food item.

20. A non-transitory computer readable medium for selecting a food item, the non-transitory computer readable medium comprising computer executable instructions that when executed by a processor of a selection server cause the processor to perform operations, the operations comprising:

storing respective ripeness preferences for a plurality of users;

obtaining an image of at least one food item having an associated ripeness from a remote device, determining a ripeness of the at least one food item based upon the image, and associating the image with a given user from among the plurality thereof;

comparing the determined ripeness with the respective ripeness preference for the given user and sending a selection notification to the remote device based upon the at least one food item being outside the respective ripeness preference, the selection notification prompting the given user for one of acceptance and rejection of the at least one food item;

updating the ripeness preference of the given user based upon the acceptance or rejection from the given user to build the ripeness preference of the given user;

generating a digital promotion for the at least one food item based upon the at least one food item being outside the respective ripeness preference, the digital promotion having a promotional value associated therewith; and setting the promotional value of the digital promotion based upon a relative closeness of the determined ripeness to the updated respective ripeness preference.

21. The non-transitory computer readable medium of claim 20 wherein the at least one food item comprises a plurality of food items each having a different associated ripeness; wherein the operations comprise comparing a respective determined ripeness of each food item with the respective ripeness preference for the given user and sending the selection notification indicating a ripeness match.

22. The non-transitory computer readable medium of claim 20 wherein the at least one food item comprises a plurality of food items; and wherein the operations comprise displaying the image of the plurality of food items, comparing the determined ripeness of each food item with the respective ripeness preference for the given user, and for each food item being outside the respective ripeness preference, generating a respective digital promotion.

23. The non-transitory computer readable medium of claim 22 wherein the operations comprise setting the promotional value of each digital promotion based upon a relative closeness of the determined ripeness of each food item to the updated respective ripeness preference, and displaying the promotional value of the digital promotion adjacent the corresponding food item.

* * * * *